Nov. 26, 1963   E. QUEDNOW   3,111,889
PHOTOGRAPHIC CAMERA CONTROL
Filed Oct. 11, 1961

INVENTOR.
Erwin Quednow
BY
Michael S. Striker
Attorney

United States Patent Office 3,111,889
Patented Nov. 26, 1963

3,111,889
PHOTOGRAPHIC CAMERA CONTROL
Erwin Quednow, Wiesbaden, Germany, assignor to Adox Fotowerke Dr. C. Schleussner G.m.b.H., Wiesbaden-Biebrich, Germany
Filed Oct. 11, 1961, Ser. No. 144,434
Claims priority, application Germany Oct. 14, 1960
12 Claims. (Cl. 95—10)

This invention concerns photographic cameras, and more specifically cameras equipped with a built-in exposure meter.

In many cameras of this type the exposure control means, namely the shutter speed or the diaphragm or both are adjustable alternatively either by hand or automatically by the exposure meter. In such cameras coupling means are provided between the exposure meter and the exposure control means in such a manner that the camera may be operated either with manual adjustment of the exposure control means or with automatic adjustment thereof by the action of the exposure meter. For obvious reasons the exposure meter contains an indicator device for visually indicating the prevailing light conditions so that the operator can guide himself accordingly while operating the camera without the above-mentioned automatic adjustment of the exposure control means.

Various types of exposure meters are known. In one type a photocell is used which produces a certain amount of electric current depending upon the illumination impinging on the photocell, and in another type the circuit of the exposure meter includes a battery and the photocell is of the variable resistance type so that the current drawn from the battery depends again upon the illumination impinging on the photocell. In both cases the current actuates an indicator device constituted by a small ammeter or voltmeter. Usually a so-called scanner detects the varying positions of the pointer or movable element of the indicator device and controls through the above-mentioned coupling the adjustment of the exposure control means.

A camera of the type set forth is operated by manual adjustment of the exposure control means in special cases, for instance when pictures are to be taken with flash light, at close range and so on. Under such circumstances it has been found advisable to interrupt the actuation of the exposure meter by the photocell while the camera is set for manual control of the exposure control means, because in this manner the operator of the camera will be reminded by the inoperativeness of the exposure meter indicator that the automatic adjustment of the exposure control means has has been switched off. In this manner wrong exposures are avoided.

It has been found, however, that a camera having the above-mentioned features is still not satisfactory in one respect. This is due to the fact that indications of the exposure meter are not available while the camera is set for manual adjustment of the exposure control means. Obviously, this is undesirable in many cases where the operator would like to make the proper adjustment of the exposure control means in accordance with prevailing light conditions, particularly if pictures are to be taken at daylight with simultaneous additional illumination by flash light.

It is therefore a main object of this invention to provide for an arrangement which avoids the above-described disadvantage.

It is another object of this invention to provide for such an arrangement which is simple, comparatively inexpensive and reliable in operation.

With above objects in view, the invention provides in a photographic camera in combination, light sensitive means; electric indicating means actuated by said light sensitive means; exposure control means actuable also by said light sensitive means; means for simultaneously interrupting actuation of said indicating means and said exposure control means by said light sensitive means; and means for reinstating actuation of said indicating means by said light sensitive means without simultaneous actuation of said exposure control means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
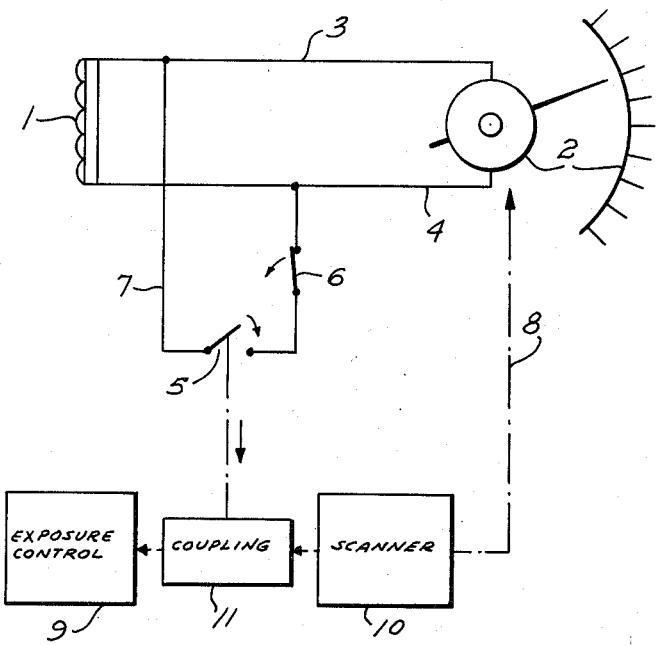
FIG. 1 is a schematic diagram illustrating one embodiment of the invention.

The embodiment according to FIG. 1 comprises a photocell of the current generating type. As can be seen the photocell 1 is connected directly by the lines 3 and 4 with an indicator device 2. However, the circuit 3, 4 is supplemented by an auxiliary circuit 7 in parallel with the terminals of the photocell 1. The auxiliary circuit 7 contains a switch 5 which in a conventional manner is normally in open position but may be closed so as to short-circuit the photocell 1. It is clear that when the switch 5 is closed no current from the photocell 1 will reach the indicator device 2.

In a conventional manner the exposure control means 9 of the camera are connected by a coupling 11 with a scanner 10 which cooperates through means symbolized by the dash-dotted line 8 with the meter 2 whereby the exposure control means 9 are automatically adjusted in accordance with varying positions of the meter 2. The coupling 11 is operatively connected with the switch 5. When the coupling 11 is disengaged in order to eliminate the automatic adjustment of the exposure control means by the meter, then simultaneously the switch 5 is moved to closed position so that in this manner the meter 2 is rendered ineffective when the automatic actuation of the exposure control means is interrupted. In accordance with the invention a second switch 6 is arranged in the auxiliary circuit 7. This switch is normally in closed position, however if it is desired to render the exposure meter effective even when the automatic adjustment of the exposure control means is interrupted because the coupling 11 and together with it the switch 5 are moved to their above-mentioned second positions, then the switch 6 is to be opened so that now the short-circuit of the photocell 1 is eliminated. Consequently the exposure meter will operate in normal fashion.

Figure 2:
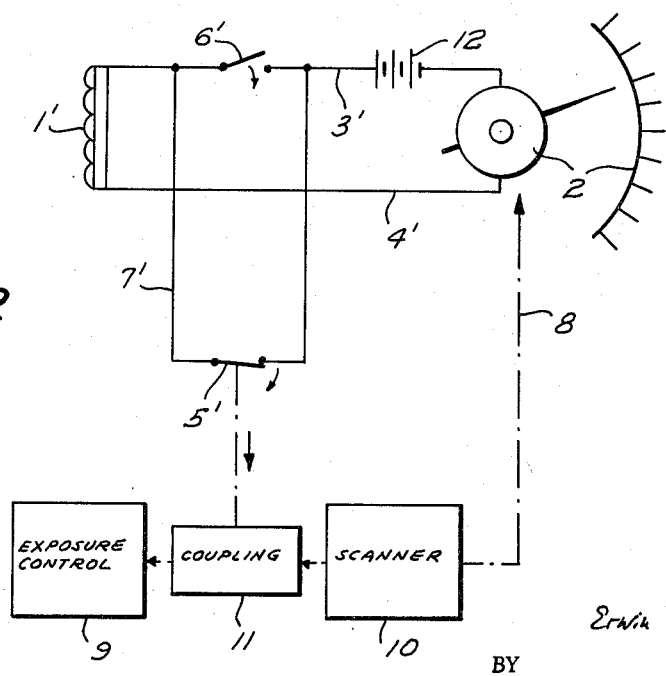
FIG. 2 is a similar schematic diagram illustrating another embodiment of the invention.

The embodiment according to FIG. 2 comprises a photocell of the variable resistance type. As can be seen, the photocell 1' is connected by the lines 3' and 4' with the meter or indicator 2, but the circuit contains also a battery 12 and a switch 6' in series between the cell 1' and the battery 12. An auxiliary circuit 7' is connected in parallel with the switch 6' and contains a switch 5'. The arrangement of the exposure control 9, the scanner 10, the coupling 11 and the connection 8 is the same as in FIG. 1. However, in this case the switch 5' operated by the coupling 11 is normally in closed position, while the second switch 6' is normally in open position, as shown. Consequently, under normal conditions the photocell 1' operates the indicator 2 via the closed switch 5'. However, when the coupling 11 is moved to its second position so as to interrupt the automatic actuation or adjustment of the exposure control means 9, then the switch 5' is simultaneously moved to open position whereby the flow of current from the battery 12 through the photocell and through the meter is interrupted. If now nevertheless the meter 2 is to be rendered operative, the switch 6' according to the invention is moved to closed position without affecting in any way the position of the coupling 11 and of the switch 5'.

The additional switches 6 or 6' according to the invention may be preferably arranged on the camera so as to be operated by a pushbutton mounted on the camera housing or other part thereof. It will be understood that the illustrated embodiments comprise switches, but that such switches or one of them may be replaced with the same effect for instance by potentiometers the resistance whereof may be varied in the usual manner between substantially zero and a predetermined maximum with the same effect.

Some known cameras are equipped, in addition to the elements shown and described above with other devices as for instance with resistors for modifying the operation of the exposure meter, secondary photocells to be used under special conditions, special diaphragms or the like. Since the normal positions of the switches 6 or 6' always correspond with a certain setting of the camera for automatic adjustment of the exposure control means, the switches 6 or 6' may be combined with other devices, or adapted for a second function, for operating the above-mentioned additional items of equipment of the camera.

It will be understood that each of the elements described above, or two or more together, may also find a useful application in other types of control means for rendering an exposure meter ineffective under one condition, and effective under a second condition differing from the types described above.

While the invention has been illustrated and described as embodied in means for simultaneously interrupting actuation of indicating means and exposure control means by light sensitive means, and second means for reinstating the actuation of said indicating means without simultaneous actuation of the exposure control means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Leters Patent is:

1. In a photographic camera, in combination,
    (a) light sensitive means;
    (b) electric indicating means actuated by said light sensitive means;
    (c) exposure control means automatically actuable also by said light sensitive means;
    (d) control means settable between an idle position and an operative position in which simultaneously actuation of said indicating means and said exposure control means by said light sensitive means is interrupted; and
    (e) means for at least temporarily reinstating, while said control means are in operative position, actuation of said indicating means by said light sensitive means under exclusion of simultaneous actuation of said exposure control means.

2. In a photographic camera, in combination,
    (a) light sensitive means;
    (b) electric indicating means actuated by said light sensitive means;
    (c) exposure control means automatically actuable also by said light sensitive means through said indicating means;
    (d) control means settable between an idle position and an operative position in which simultaneously actuation of said indicating means and said exposure control means by said light sensitive means is interrupted; and
    (e) means for at least temporarily reinstating, while said control means are in operative position, actuation of said indicating means by said light sensitive means under exclusion of simultaneous actuation of said exposure control means.

3. In a photographic camera, in combination,
    (a) light sensitive means;
    (b) electric indicating means actuated by said light sensitive means;
    (c) exposure control means actuable alternatively by manual operation and also automatically by said light sensitive means;
    (d) control means settable between an idle position and an operative position in which simultaneously actuation of said indicating means and said exposure control means by said light sensitive means is interrupted; and
    (e) means for at least temporarily reinstating, while said control means are in operative position, actuation of said indicating means by said light sensitive means under exclusion of simultaneous actuation of said exposure control means.

4. In a photographic camera, in combination,
    (a) light sensitive means;
    (b) electric indicating means actuated by said light sensitive means;
    (c) exposure control means actuable alternatively by manual operation and also automatically by said light sensitive means through said indicating means;
    (d) control means settable between an idle position and an operative position in which simultaneously actuation of said indicating means and said exposure control means by said light sensitive means is interrupted; and
    (e) means for at least temporarily reinstating, while said control means are in operative position, actuation of said indicating means by said light sensitive means under exclusion of simultaneous actuation of said exposure control means.

5. In a photographic camera, in combination,
    (a) light sensitive means;
    (b) electric indicating means including an indicator device and circuit means connecting said light sensitive means with said indicator device for providing actuation of the latter by said light sensitive means;
    (c) exposure control means actuable alternatively by manual operation and also automatically by said light sensitive means;
    (d) control means settable between an idle position and an operative position in which simultaneously actuation of said indicating means and said exposure control means by said light sensitive means is interrupted, said control means including coupling means movable between a first position providing automatic actuation of said exposure control means by said light sensitive means, and a second position interrupting the actuation of said exposure control means, and first current flow controlling means in said circuit means and movable between a first position providing for the actuation of said indicator device by said light sensitive means, and a second position interrupting such actuation; and
    (e) second current flow controlling means movable between a normal and a second position and arranged in said circuit means for at least temporarily reinstating, while said control means are in operative position, actuation of said indicating means by said light sensitive means while said coupling means and said second current flow controlling means are both in their second position.

6. In a photographic camera, in combination,
(a) light sensitive means;
(b) electric indicating means including an indicator device and circuit means connecting said light sensitive means with said indicator device for providing actuation of the latter by said light sensitive means;
(c) exposure control means actuable alternatively by manual operation and also automatically by said light sensitive means through said indicating means;
(d) control means settable between an idle position and an operative position in which simultaneously actuation of said indicating means and said exposure control means by said light sensitive means is interrupted, said control means including coupling means movable between a first position providing automatic actuation of said exposure control means, and a second position interrupting the actuation of said exposure control means through said indicating means, and first current flow controlling means in said circuit means and movable between a first position providing for the actuation of said indicator device by said light sensitive means, and a second position interrupting such actuation; and
(e) second current flow controlling means movable between a normal and a second position and arranged in said circuit means for at least temporarily reinstating actuation, while said control means are in operative position, of said indicating means by said light sensitive means while said coupling means and said second current flow controlling means are both in their second position.

7. In a photographic camera, in combination,
(a) light sensitive means;
(b) electric indicating means including an indicator device and circuit means connecting said light sensitive means with said indicator device for providing actuation of the latter by said light sensitive means;
(c) exposure control means actuable alternatively by manual operation and also automatically by said light sensitive means;
(d) control means settable between an idle position and an operative position in which simultaneously actuation of said indicating means and said exposure control means by said light sensitive means in interrupted, said control means including coupling means movable between a first position providing automatic actuation of said exposure control means, and a second position interrupting the actuation of said exposure control means by said light sensitive means, and first switch means in said circuit means and movable between a first position providing for current flow from said light sensitive means to said indicator device, and a second position interrupting such current flow; and
(e) second switch means movable between a normal and a second position and arranged in said circuit means for at least temporarily reinstating, while said control means are in operative position, current flow from said light sensitive means to said indicating means while said coupling means and said second switch means are both in their second position.

8. In a photographic camera, in combination,
(a) light sensitive means;
(b) electric indicating means including an indicator device and circuit means connecting said light sensitive means with said indicator device for providing actuation of the latter by said light sensitive means;
(c) exposure control means actuable alternatively by manual operation and also automatically by said light sensitive means through said indicating means;
(d) control means settable between an idle position and an operative position in which simultaneously actuation of said indicating means and said exposure control means by said light sensitive means is interrupted, said control means including coupling means movable between a first position providing automatic actuation of said exposure control means, and a second position interrupting the actuation of said exposure control means through said indicating means, and first switch means in said circuit means and movable between a first position providing for current flow from said light sensitive means to said indicator device, and a second position interrupting such current flow; and
(e) second switch means movable between a normal and a second position and arranged in said circuit means for at least temporarily reinstating, while said control means are in operative position current flow from said light sensitive means to said indicating means while said coupling means and said second switch means are both in their second position.

9. In a photographic camera, in combination,
(a) current generating light sensitive means;
(b) electric indicating means including an indicator device and circuit means connecting said light sensitive means with said indicator device for providing actuation of the latter by said light sensitive means;
(c) exposure control means actuable alternatively by manual operation and also automatically by said light sensitive means;
(d) control means settable between an idle position and an operative position in which simultaneously actuation of said indicating means and said exposure control means by said light sensitive means in interrupted, said control means including coupling means movable between a first position providing automatic actuation of said exposure control means, and a second position interrupting the actuation of said exposure control means by said light sensitive means, and first switch means in said circuit means and movable between a first position providing for current flow from said light sensitive means to said indicator device, and a second position interrupting such current flow by establishing a short-circuit for said light sensitive means; and
(e) second switch means movable between a normal and a second position and arranged in said circuit means for at least temporarily reinstating, while said control means are in operative position current flow from said light sensitive means to said indicating means by interrupting said short-circuit while said coupling means and said second switch means are both in their second position.

10. In a photographic camera, in combination,
(a) current generating light sensitive means;
(b) electric indicating means including an indicator device and circuit means connecting said light sensitive means with said indicator device for providing actuation of the latter by said light sensitive means;
(c) exposure control means actuable alternatively by manual operation and also automatically by said light sensitive means through said indicating means;
(d) control means settable between an idle position and an operative position in which simultaneously actuation of said indicating means and said exposure control means by said light sensitive means is interrupted, said control means including coupling means movable between a first position providing automatic actuation of said exposure control means, and a second position interrupting the actuation of said exposure control means through said indicating means, and first switch means in said circuit means and movable between a first position providing for current flow from said light sensitive means to said indicator device, and a second position interrupting such current flow by establishing a short-circuit for said light sensitive means; and (e) second switch means movable between a normal and a second position and arranged in said circuit means for at least temporarily reinstating, while said control means are in operative position current flow from said light sensitive means to said indicating means by interrupting said short-circuit while said coupling means and said second switch means are both in their second position.

11. In a photographic camera, in combination,
(a) light sensitive means of the variable resistance type;
(b) electric indicating means including an indicator device and circuit means comprising a source of electrical energy and connecting said light sensitive means with said indicator device for providing actuation of the latter by said light sensitive means;
(c) exposure control means actuable alternatively by manual operation and also automatically by said light sensitive means;
(d) control means settable between an idle position and an operative position in which simultaneously actuation of said indicating means and said exposure control means by said light sensitive means is interrupted, said control means including coupling means movable between a first position providing automatic actuation of said exposure control means, and a second position interrupting the actuation of said exposure control means by said light sensitive means, and first switch means in said circuit means and movable between a first position providing for current flow from said source through said light sensitive means to said indicator device, and a second position interrupting such current flow; and
(e) second switch means movable between a normal and a second position and arranged in said circuit means for at least temporarily reinstating, while said control means are in operative position current flow from said source through said light sensitive means by shunting said first switch means while said coupling means and said second switch means are both in their second position.

12. In a photographic camera, in combination,
(a) light sensitive means of the variable resistance type;
(b) electric indicating means including an indicator device and circuit means comprising a source of electrical energy and connecting said light sensitive means with said indicator device for providing actuation of the latter by said light sensitive means;
(c) exposure control means actuable alternatively by manual operation and also automatically by said light sensitive means through said indicating means;
(d) control means settable between an idle position and an operative position in which simultaneously actuation of said indicating means and said exposure control means by said light sensitive means is interrupted, said control means including coupling means movable between a first position providing automatic actuation of said exposure control means, and a second position interrupting the actuation of said exposure control means through said indicating means, and first switch means in said circuit means and movable between a first position providing for current flow from said source through said light sensitive means to said indicator device, and a second position interrupting such current flow; and
(e) second switch means movable between a normal and a second position and arranged in said circuit means for at least temporarily reinstating, while said control means are in operative position current flow from said source through said light sensitive means by shunting said first switch means while said coupling means and said second switch means are both in their second position.

References Cited in the file of this patent
UNITED STATES PATENTS

| | | |
|---|---|---|
| 2,969,004 | Gebele | Jan. 24, 1961 |
| 3,013,478 | Gebele | Dec. 19, 1961 |
| 3,022,714 | Rentschler | Feb. 27, 1962 |